United States Patent
Pratt et al.

[11] Patent Number: 5,575,093
[45] Date of Patent: Nov. 19, 1996

[54] COUPLER ASSEMBLY

[75] Inventors: Samuel S. Pratt, Bedford; Dan Shaffer, Duncansville; Tim A. Davis, Berlin; Ashley Heiple, Alum Bank, all of Pa.; Peter N. Lalos, Gaithersburg, Md.

[73] Assignee: Rockland, Inc., Bedford, Pa.

[21] Appl. No.: 425,628

[22] Filed: Apr. 20, 1995

[51] Int. Cl.⁶ .................................................. E02F 3/96
[52] U.S. Cl. ........................... 37/468; 414/723; 414/724; 403/322; 403/335
[58] Field of Search ..................... 37/468, 379; 172/272, 172/274; 414/723, 724; 403/321, 322, 325, 335–338, 381, 84, 87, 13

[56] References Cited

U.S. PATENT DOCUMENTS

| | | | |
|---|---|---|---|
| 264,524 | 9/1882 | Githens | 403/335 X |
| 3,356,325 | 12/1967 | Schnase | 403/322 X |
| 4,369,590 | 1/1983 | Miller | 37/283 X |
| 4,663,866 | 5/1987 | Karlsson et al. | 414/723 X |
| 4,735,451 | 4/1988 | Wojciechowski et al. | 414/723 X |
| 4,775,258 | 10/1988 | Lange | 403/381 X |
| 4,890,974 | 1/1990 | Kistner | 414/723 |
| 4,944,628 | 7/1990 | Huldén | 403/322 X |
| 5,237,762 | 8/1993 | Sandberg | 37/468 |
| 5,333,400 | 8/1994 | Sonerud | 414/723 X |
| 5,467,542 | 11/1995 | Hulden | 37/468 |

FOREIGN PATENT DOCUMENTS

| | | | |
|---|---|---|---|
| 996650 | 2/1983 | Russian Federation | 414/723 |

*Primary Examiner*—Terry Lee Melius
*Assistant Examiner*—Thomas A. Beach
*Attorney, Agent, or Firm*—Lalos & Keegan

[57] ABSTRACT

An assembly for coupling an implement to an operating arm of a machine comprising a first component fixedly mountable on the implement, a second component connectable to the operating arm, one of the components having a slot in a side and bottom thereof, disposed substantially radially relative to a given axis, and the other of the components having a section receivable into the slot to position the components in coupling relation, the components having engageable surfaces permitting angular displacement and precluding axial displacement relative to the given axis when the components are disposed in coupling relation and retaining means disposable in abutting relation relative to the components when disposed in coupled relation for precluding angular displacement between the components relative to the axis.

18 Claims, 3 Drawing Sheets

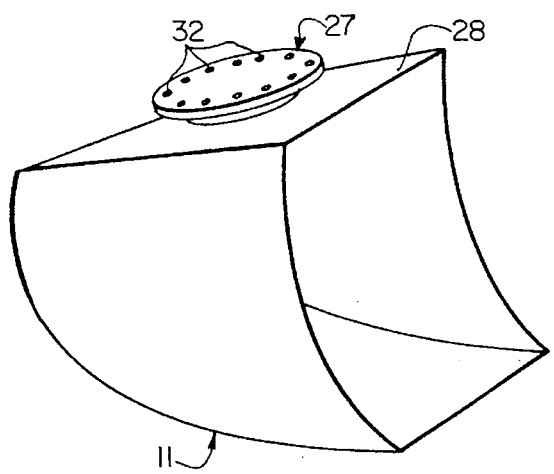
FIG. 3
FIG. 4
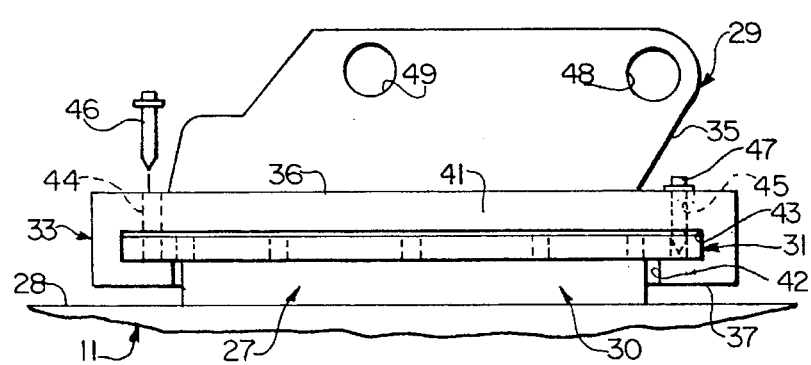
FIG. 5
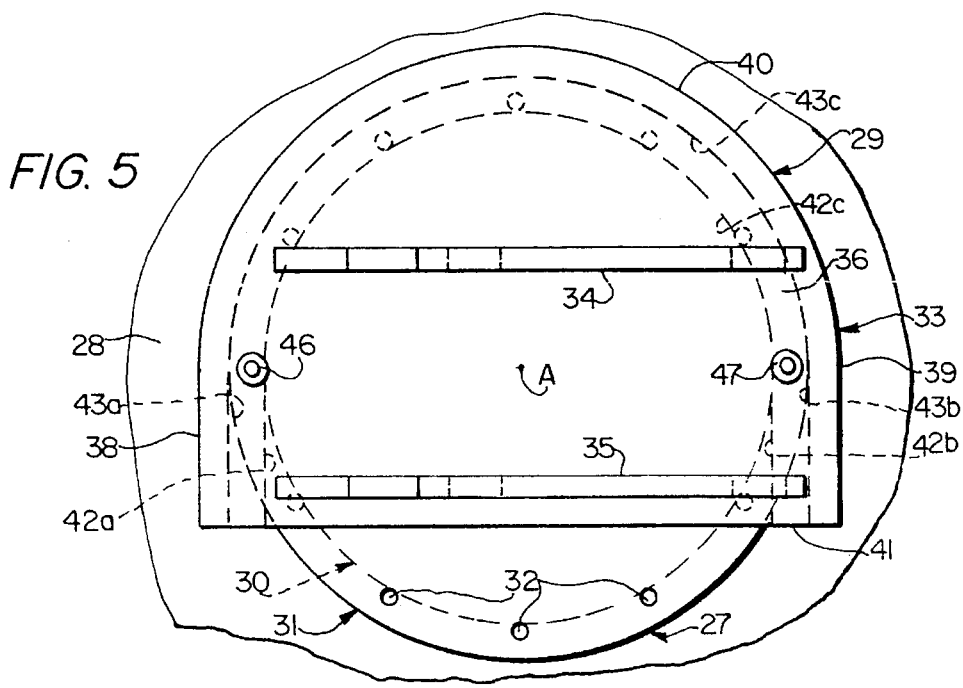

COUPLER ASSEMBLY

This invention relates to an coupler assembly and more particularly to an assembly for coupling an implement such as a bucket and the like to the operating arm of a machine such an excavator.

In the prior art, there has been developed a type of coupling assembly for connecting an implement to the operating arm of a machine at selected angles relative to the operating arm about a given axis. Generally, such assembly has consisted of a gripping plate component fixedly mounted on an upper wall surface of the implement, having an annular beveled gripping surface, and a gripping component detachably connectable to the operating arm of the machine, having a pair of jaw members adapted to be extended and retracted either into or out of gripping engagement with the annular gripping surface of the coupling component provided on the implement. Such type of coupling assembly is illustrated and described in the more detail in U.S. Pat. No. 4,944,628 dated Jul. 31, 1990.

In coupling the components of such an assembly together, it requires the operator of the machine to maneuver the operating arm of the machine in a manner to position the jaw members of the arm connected component in opposed relationship to the annular gripping surface of the implement mounted component before the gripping members may be retracted or extended into gripping engagement with such surface. Often, the machine operator may not have sufficient skill to properly maneuver the operating arm of the machine to bring the arm connected component into a properly aligned position relative to the implement mounted component, or the operating arm and/or the arm connected component might possibly partially or totally obscure the operator's view of the implement mounted component thus rendering it more difficult to effect a proper coupling of the components. It thus has been found to be desirable to provide a coupling assembly of the type described having a design which provides clear visibility of the coupling components when seeking to couple them together thus greatly facilitating the coupling of such components.

Accordingly, it is the principal object of the present invention to provide an improved assembly for coupling an implement to the operating arm of a machine such as an excavator and the like.

Another object of the present invention is to provide an improved assembly for coupling an implement to the operating arm of a machine, which is of the type providing for the angular displacement of the implement relative to the operating arm of the machine about a given axis.

A further object of the present invention is to provide an assembly for coupling an implement to the operating arm of a machine in which the operator of the machine may effect the coupling by the operation of conventional controls provided at the operator's station on the machine.

A still further object of the present invention is to provide an improved assembly for coupling an implement to the operating arm of a machine in which the coupling and uncoupling of the implement may be effected by the maneuvering of the operating arm and in which the operator has an improved view of the implement thereby facilitating the maneuvering of the operating arm to effect coupling.

Another object of the present invention is to provide an improved coupling assembly consisting of a coupling component mounted on an implement and a cooperating coupling component connected to the operating arm of a machine, in which the operating arm may be maneuvered by operating various controls at the operator's station on the machine to position the arm connected component into coupling relation with the implement mounted component, and in which the operator has an improved line of vision of the implement mounted component thus facilitating the positioning of the arm connected component relative to the implement mounted component for effectively coupling such components.

A further object of this present invention is to provide an improved coupler assembly which is comparatively simple in design, relatively inexpensive to manufacture and highly effective in performance.

Other objects and advantages of the present invention will become more apparent to those persons have ordinary skill in the art to which the present invention pertains from the following description taken in conjunction with the accompanying drawings wherein:

FIG. 3 is a perspective view of the bucket shown in FIGS. 1 and 2, illustrating the bucket disconnected from the operating arm of the machine;

FIG. 4 is an enlarged, side elevational view of the coupling assembly shown in FIGS. 1 and 2, having a portion of the bucket broken away;

FIG. 5 is an top plan view of the coupling assembly shown in FIG. 4;

Figure 1:
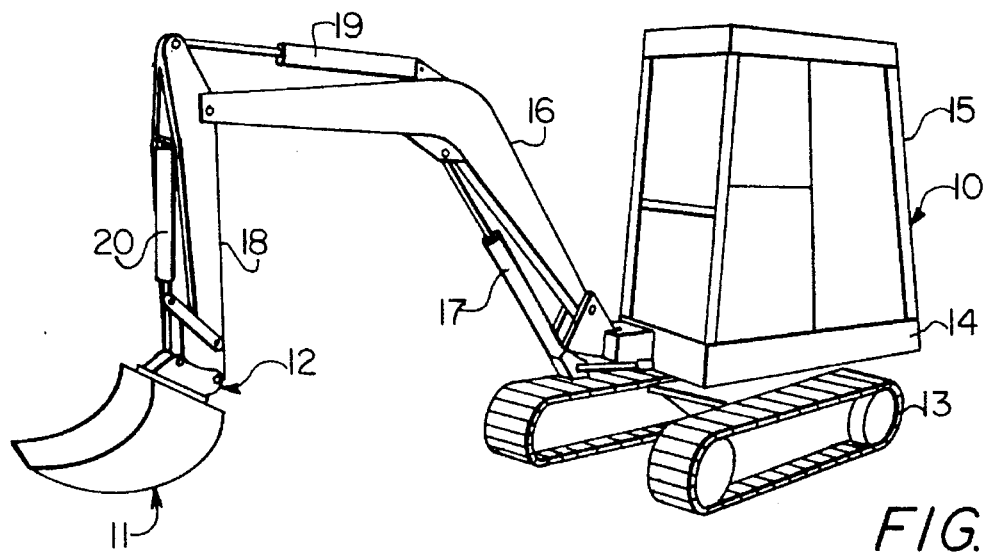
FIG. 1 is a perspective view of an excavator machine having a bucket connected thereto by means of a coupling assembly embodying the present invention.
Figure 2:
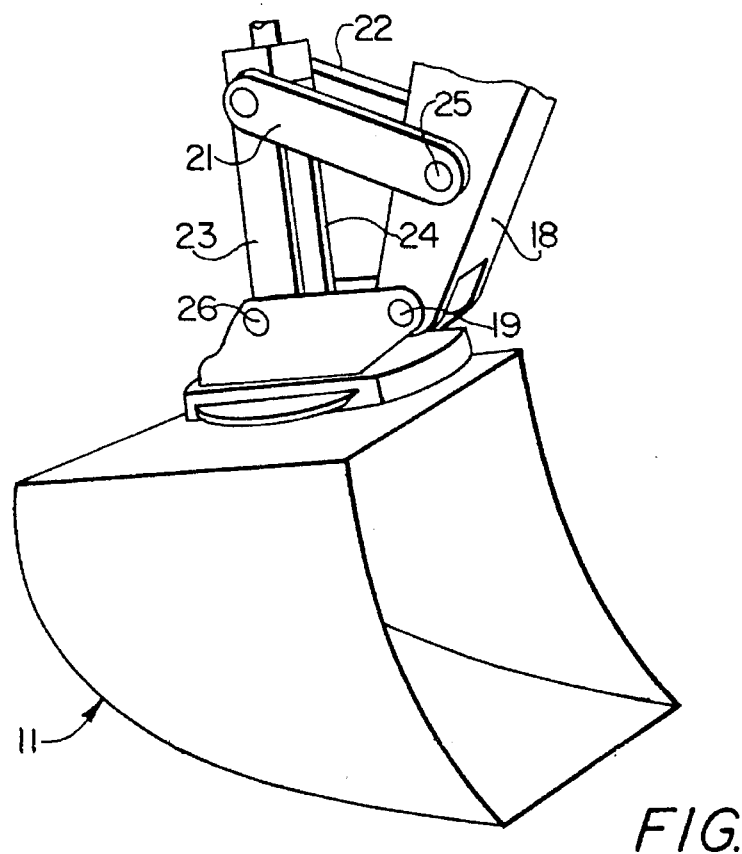
FIG. 2 is an enlarged perspective view of the operating arm of the machine, bucket and coupling assembly shown in FIG. 1, illustrating the bucket at an angle displaced 180° from the position shown in FIG. 1 and having a portion of the operating arm broken away.

Referring to FIGS. 1 through 3 of the drawings, there is illustrated an excavator machine 10 having a bucket 11 detachably connected thereto by means a coupling assembly 12. The machine is of a conventional construction provided with a crawler unit 13, a main frame 14 mounted on the crawler unit for pivotal movement about a vertical axis and a cab structure 15 mounted on the main frame and housing the operator's station. Pivotally mounted on the front end of the main frame is a conventional boom 16 adapted to pivot about a horizontal axis. The boom is pivoted by a hydraulic cylinder assembly 17 operatively interconnecting the main frame of the machine and a set of brackets disposed on the underside of the boom. An operating arm 18 is mounted on the free end of the boom and is adapted to be pivoted about a horizontal axis by means of a hydraulic cylinder assembly 19 operatively interconnecting an intermediate portion of the boom and an upper free end of the operating arm. A bucket 11 is connected to the lower free end of the operating arm by means of coupler assembly 12 and is adapted to pivot about the axis of a connecting pin 19. The pivotal movement of the bucket relative to the operating arm about the horizontal axis of connecting pin 19 is effected by a hydraulic cylinder assembly 20 pivotally connected at an upper end to an upper end portion of the operating arm, and pivotally connected at a lower end to a pair of support links 21 and 22 and a pair of connecting links 23 and 24. As best shown in FIG. 2, support links 22 are pivotally connected to a lower portion of operating arm 18 by means of a connecting pin 25 and the lower ends of connecting links 23 and 24 are pivotally connected to the coupler assembly by means of a connecting pin 26. It will be appreciated that upon operation of suitable controls in the cab of the machine, the entire front end assembly of the machine may be swung about a vertical axis, boom 16 may be raised and lowered, the operating arm may be pivoted relative to the boom and the bucket may be pivoted relative to the operating arm to perform various work functions with the bucket or any other implement which may be connected to the lower end of the operating arm.

Referring to FIGS. 3 through 5, coupling assembly 12 consists of a coupling component 27 adapted to be fixedly secured to an upper wall portion 28 of bucket 11, and a coupler component 29 adapted to be connected to the operating arm of the machine by means of connecting pins 19 and 26, cooperable with component 27 to detachably secure the bucket to the operating arm of the a machine. Coupling component 27 includes a base section 30 welded or otherwise fixedly secured to upper wall surface 28 of the bucket, and provided with an annular side wall surface, and an upper circular plate section 31 having a diameter greater than the diameter of base section 30 so that the peripheral portion of the plate section extends beyond the base section in spaced relation from upper wall portion 28. Component 27 has a T-shaped cross-sectional configuration taken along a diameter thereof and further is provided with a plurality of circumferentially spaced locking pin receiving openings 32 about the periphery of circular plate section 31.

Coupling component 29 includes a base section 33 provided with a pair of bracket portions 34 and 35. The base section includes upper and lower surfaces 36 and 37, a pair of parallel end surfaces 38 and 39, a semi-cylindrical side surface 40 merging with end surfaces 38 and 39 and a side surface 41 spaced from the axis of semi-cylindrical side wall surface 40 and disposed substantially perpendicular to end wall surface 38 and 39. As best seen in FIG. 4, side wall surface 41 and bottom wall surface 37 are provided with a slot 42 having an enlarged section 43 for receiving the circular plate and base sections of coupling component 27 therein when the components are disposed in coupling relation as shown in FIGS. 4 and 5.

Slot 42 is provided with a pair of opposed, parallel surfaces 42a and 42b and a semi-cylindrical end wall 42c which merges at its ends with side wall surfaces 42a and 42b. The spacing between opposed slot wall surfaces 42a and 42b is slightly greater than the diameter of base section 30 and the radius of slot wall surface 42c is slightly greater than the radius of base section 30 so that when the components are in coupling relation, base section 30 of component 27 will be received within slot 42 and be disposed concentrically relative to component 29. Correspondingly, enlarged slot section 43 is provided with a pair of opposed side wall surfaces 43a and 43b and semi-circular end wall surface 43c merging with opposed wall surfaces 43a and 43b. The spacing between opposed wall surfaces 43a and 43b is slightly greater than the diameter of circular plate section 31 of component 27 and the radius of end wall surface 43c, is slightly greater than the radius of plate section 31 so that the peripheral portion of plate section 31 will be received within enlarged slot section 43 when the components are disposed in coupling relation as shown in FIGS. 4 and 5.

Base section 33 further is provided with a pair of locking pin receiving openings 44 and 45, diametrically opposed relative to the axis of semi-circular slot wall surfaces 42c and 43c, and registrable with a diametrically opposed set of locking pin receiving openings 32 of plate section 31 when the coupling components are in the coupled condition. When component 27 is received within slot 42 and pin receiving openings 44 and 45 are registered with a pair of diametrically opposed pin receiving openings 32 in plate section 31 of inserted component 27, a set of locking pins 46 and 47 may be inserted into the registered openings to lock the angular position of coupling component 27 and correspondingly bucket 11 relative coupling component 29 and correspondingly operating arm 16 about axis of A.

Bracket portions 34 and 35 are equally spaced apart relative to a diametrically disposed line passing through the center lines of openings 44 and 45, and are provided with a pair of rearwardly disposed, transversely aligned openings 48, 48 adapted to receive connecting pin 19 for connecting the coupling assembly and bucket to operating arm 18, and a pair of forwardly disposed, transversely aligned openings 49, 49 adapted to receive connecting pin 26 therethrough for connecting the coupling assembly and bucket to connecting links 23 and 24.

In the use of the coupler assembly described for coupling the bucket 11 to the operating arm of the machine, with the bucket positioned on the ground as shown in FIG. 3 and coupling component 29 connected to the operating arm as shown in FIGS. 1 and 2, the controls of the machine are operated to maneuver and position side wall surface 41 of component 12 aside coupler component 27 so that slot 42 of base section 33 is transversely aligned with the base and plate sections of component 27. With the components thus aligned, the controls on the machine are operated to shift coupler component 29 in a sidewise direction to receive coupling component 27 within the slot of component 29. In doing so, if the bucket is angularly disposed relative to the component 29 and operating arm as desired, and the set of pin receiving openings 44 and 45 are registered with a set of pin receiving openings 32 of section 31, locking pins 46 and 47 may be inserted to lock the coupling components together in the desired angular relation. With such components thus locked together, axial displacement between the components will be prevented by the positioning of the peripheral portion of plate section 31 in the enlarged section of slot 42, and angular displacement between the components about their common axis will be prevented by locking pins 46 and 47.

If coupling component 27 is received within slot 42 of component 29 and the components are positioned in their desired angular relation but without the pin receiving openings in proper registry, the machine controls may be operated to joggle coupling component 29 to register the appropriate pin receiving openings and allow the insertion of the locking pins. If coupling component 29 is positioned on coupling component 27 but the bucket is not properly oriented relative to the operating arm, the machine controls may be operated prior to the insertion of the locking pins to angularly displace the bucket to the desired angle relative to the operating arm. This may be accomplished most effectively on operating the controls to slightly tip the bucket to prevent its withdraw from slot 42. With practice, the operator would be able to maneuver the operating arm to position the bucket at the desired angle relative to the operating arm. When the machine has been in operation and it would be desired to change the angular relationship of the bucket relative to the operating arm, all that need be done would be to maneuver the machine to position the bucket on the ground, remove the locking pins, maneuver the machine to position the bucket relative to the operating arm at the desired new angle and then reinsert the locking pins.

In mounting the bucket on the operating arm as described, it will appreciated that the side entry of coupling component 27 into the receiving slot of coupling component 29 provides an unobstructed view of the components by the operator thus facilitating the proper alignment of the components and the operation of the machine to move coupling component 29 in a sidewise direction for receiving coupling component 27 within the slot thereof. The operating arm of the machine would not obstruct the view of the coupler components as in prior art coupling assemblies in which a fore and aft alignment of the coupling components is required.

Figure 6:
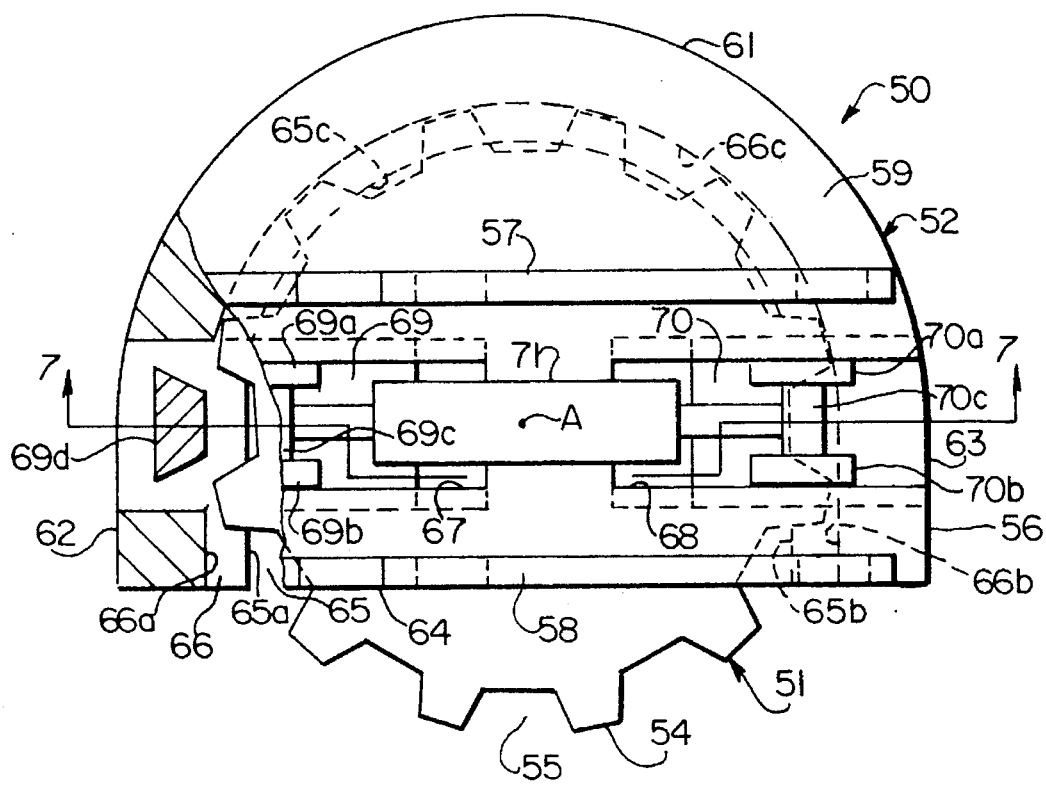
FIG. 6 is an top plan view of a coupling assembly comprising another embodiment of the invention, having a portion thereof broken away.
Figure 7:
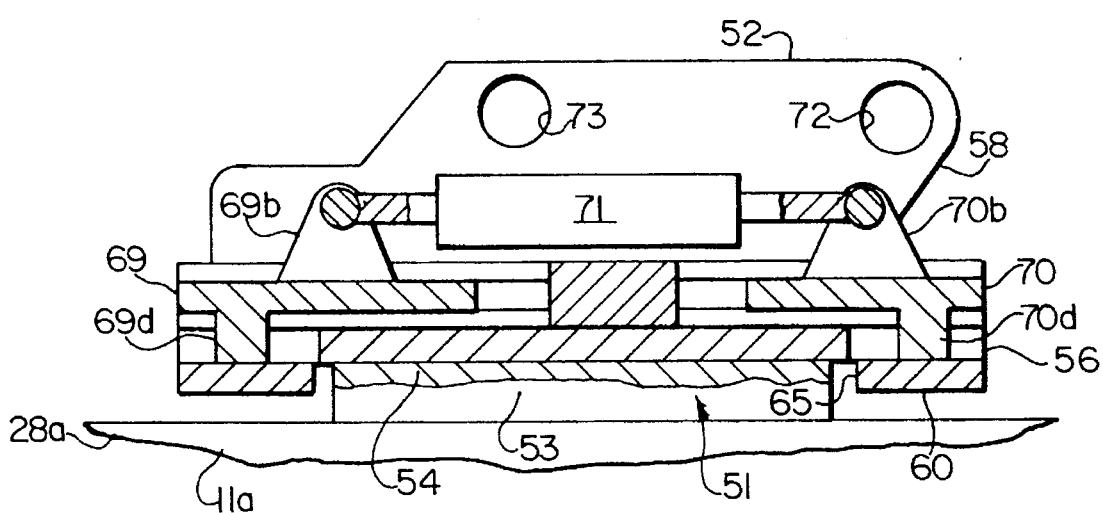
FIG. 7 is a cross-sectional view taken along line 7—7 in FIG. 6.

FIGS. 6 and 7 illustrate another embodiment of the invention which comprises an assembly 50 consisting of coupling components 51 and 52. The assembly is similar to previously described coupling assembly 12 and differs principally in the means provided for precluding angular displacement of the implement relative to the operating arm of the machine about a given axis. In lieu of a pair of locking pins insertable in registrable pin receiving openings in the two components, this alternate assembly provides for a pair of lugs adapted to the displaced along a diametrical line of travel into and out of a pair of registrable recesses of a portion of the coupling component fixedly secured to the implement.

Referring to FIGS. 6 and 7, coupling component 51 of assembly 50 includes a base section 53 welded or otherwise rigidly secured to upper wall portion 28a of an implement 11a, having an annular side wall surface and a circular plate section 54 having a diameter greater than the diameter of section 53, providing a peripheral flange portion having a plurality of circumferentially spaced recesses 55 to provide a gear-like configuration. Coupling component 52 generally consists of a base section 56 having a pair of bracket portions 57 and 58. Base section 56 includes upper and lower surfaces 59 and 60, a semi-cylindrical side surface 61, a pair of end surfaces 62 and 63 disposed substantially tangentially relative to semi-cylindrical side surface 61, and a side surface 64 spaced from the axis of semi-cylindrical surface 61 and disposed parallel to a diameter relative to such axis. Side wall surface 64 and bottom surface 60 are provided with a slot 65 provided with an enlarged section 66. Slot 65 includes a pair of opposed parallel wall surfaces 65a and 65b and a semi-cylindrical rear end wall surface 65c disposed concentrically relative to semi-cylindrical side wall surface 61. Enlarged slot section 66 similarly is provided with a pair of opposed, parallel side wall surfaces 66a and 66b and semi-cylindrical rear wall surface 66c disposed concentrically with semi-cylindrical wall surface 65c.

The spacing between slot wall surfaces 65a and 65b corresponding to the throat portion of a T-shaped slot, is slightly greater than the diameter of the component section 53 and the spacing between slot section wall surfaces 66a and 66b is slightly greater than the diameter of plate section 54 so that coupling member 51 will be received in slot 65 of component 52 in coupling relation as shown in FIGS. 6 and 7 with component base section 53 disposed between opposed slot surfaces 65a and 65b and possibly engaging rear surface 66c, and with the peripheral portion of plate section 54 received within enlarged slot sections 66 between enlarged slot section wall surfaces 66a and 66b and possibly engaging semi-cylindrical wall section 66c.

As best shown in FIG. 6, upper wall surface 59 and end wall surfaces 62 and 63 of base member 59 are provided with a pair of radially disposed recesses 67 and 68 communicating with portions of enlarged slot section 66. Such recesses further are provided with a pair of opposed guide slots in the side wall surfaces thereof which receive protruding side edge portions of a pair of carrier members 69 and 70 which are adapted to be displaced radially relative to the axis of semi-cylindrical wall surfaces 65c and 66c. Carrier member 69 is provided with a pair of upwardly projecting bracket portions 69a and 69b provided with a connecting pin 69c, and carrier member 70 is provided with a similar set of bracket portions 70a and 70b provided with a connecting pin 70c. The carrier members are caused to extend and retract along a diametrical line of travel by means of a hydraulic cylinder assembly 71 having a set of rod portions operatively interconnecting pins 69c and 70c. The carrier members further are provided with depending locking lugs 69d and 70d which are adapted to be extended beyond the periphery of plate section 54 to permit the insertion and withdrawal of coupling component 51 into and out of slot 65 of coupling component 52, and the angular displacement of the coupled components relative to each other when in the coupled condition, and retracted to be received within a pair of aligned recesses 55 about the perimeter of plate section 54 to prevent both the withdrawal of coupling component 51 from slot 65 of coupling component 52 and the angular displacement of the components relative to each other, under the action of cylinder assembly 71.

Bracket portions 57 and 58 are provided with a pair rearedly disposed, transversely aligned openings 72, 72 adapted to receive pin 19 for pivotally connecting the coupling assembly and correspondingly implement 11a to the lower end of operating arm 18, and a pair of forwardly disposed transversely aligned openings 73, 73 adapted to receive pin 26 for pivotally connecting the coupling assembly and correspondingly implement 11a to connecting links 23 and 24.

Coupling assembly 50 is used in essentially the same manner as described in connection with coupler assembly 12. Coupler component 52 is positioned to one side of the component 51 with slot 65 aligned with base section 53 and plate section 54, and component 52 is moved sidewise to receive component 51 within slot 65 to the position as shown in FIGS. 6 and 7. With the components thus positioned, suitable controls are operated at the operator's station of the machine to retract the rod portions of cylinder assembly 71 and cause depending locking lugs 69d and 70d to be received within a pair of aligned recesses 55 of plate section 54. It will be appreciated that the positioning of locking lugs 69d and 70d in a set of aligned recesses 55 would prevent both the uncoupling of components 51 and 52 and the angular displacement of the implement relative to the operating arm about the axis of cylindrical wall surfaces 65c and 66c. If further will be appreciated that upon insertion of component 51 into the slot of component 52, if a pair of recesses 55 are not precisely aligned with locking lugs 69d and 70d , either inward movement of the lugs will cam the teeth of plate section 54 to properly align the recesses or the operating arm may be joggled to obtain alignment. Preferably, the sides of recesses 55 and the side portions of locking lugs 69d and 70d are tapered or beveled to facilitate the entry of lugs 69d and 70d into adjacent recesses and further provide adjustment if such recesses are slightly out of alignment.

Although the embodiments of the invention have been described as providing a side entry of the implement mounted component into the slot of the arm mounted component, it could be possible to provide for a front or rear entry of the implement mounted component into the slot of the arm mounted component, depending on the location of the operator's station on the machine, if such an arrangement provides a better line of vision for the operator which would facilitate the coupling operation.

The components of the assemblies as described can be of either a cast or fabricated construction although it is preferred that the components be cast with minimal machining to reduce cost. It further is contemplated that the invention be used with a variety of different implements in which a coupling component comparable to described components 27 and 51 would be fixedly secured to different implements and a single component comparable to coupling components 29 and 52 would be detachably connectable to the operating arm of a machine so that it may be used to couple a variety of different working implements thereby enhancing the versatility of the invention for performing a number of work functions.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. An assembly for coupling an implement to an operating arm of a machine comprising:

a first component fixedly mountable on said implement;

a second component connectable to said operating arm;

one of said components having a slot in a side and bottom thereof, disposed substantially radially relative to a given axis, said slot including diametrically opposed fixed sides, and the other of said components having a section receivable within said slot to position said components in coupling relation, said components having engageable surfaces permitting angular displacement and precluding axial displacement relative to said given axis when said other component is disposed in said slot of said one component; and retaining means disposable in abutting relation relative to said components when disposed in said coupled relation for precluding angular displacement between said components relative to said axis.

2. An assembly according to claim 1 wherein said engageable surfaces permitting angular displacement and precluding axially displacement relative to said axis are disposed annularly relative to said axis.

3. An assembly according to claim 1 wherein said one component includes means providing and end wall abutment surface of said slot engageable by said other component section for positioning said components in said coupling relation.

4. An assembly according to claim 1 wherein said other component section includes an annular flange portion received in a pair of recesses provided in a pair of opposed side walls of said slot in said one component.

5. An assembly according to claim 1 wherein said other component is provided with an annular recess which receives a pair of inwardly projection portions of said one component defining a portion of said slot.

6. An assembly according to claim 1 wherein said retaining means comprises a locking pin insertable in an opening in one of said components and a selected one of a plurality of registrable openings in the other of said components circumferentially spaced relative to said axis when said components are disposed in said coupling relation.

7. An assembly according to claim 1 wherein said retaining means comprises a plurality of sets of opposed abutment surfaces provided on one of said components, spaced circumferentially relative to said given axis when said components are in coupling relation, means mounted on the other of said components, registrable with a selected set of opposed abutment surfaces and displaceable between a first position between a said selected registered set of abutment surfaces for restricting the angular displacement of said components relative to each other about said axis, and a second position clear of said set of abutment surfaces for permitting angular displacement of said components relative to each other about said axis, and means for displacing said retaining means between said first and second positions.

8. An assembly according to claim 7 wherein said displacing means comprises a fluid actuated cylinder assembly.

9. An assembly according to claim 7 wherein said retaining means is displaceable between said first and second positions along a line of travel disposed diametrically relative to said axis.

10. An assembly for coupling an implement to an operating arm of a machine comprising:

a first component fixedly mountable on said implement having a main body section provided with an annular flange portion on an upper end thereof; and a second component connectable to said operating arm, provided with a slot in a side surface and bottom surface thereof, having a cross-sectional configuration corresponding to a cross-section of an upper portion of said main body section of said first component through an axis of said annular flange portion thereof, and including diametrically opposed fixed sides, for receiving said upper portion of said main body section of said first component therein to position said components in coupling relation permitting angular displacement to a desired position and precluding displacement thereof along a line of travel coinciding with the axis of said annular flange portion when said components are in said coupling relation; and detachable means disposable in abutting relation to said components when disposed in said coupling relation at said desired position for precluding further angular displacement between said components relative to said axis.

11. An assembly according to claim 10 wherein said slot has a T-shape configuration, said annular flange portion of said first component is receivable within inwardly opening portions of said slot and a portion of said main body section of said first component is received within a throat portion of said slot.

12. An assembly according to claim 10 wherein said slot is provided with a arcuate end wall engageable by an arcuate side surface of said annular flange portion when said flange portion is received in said slot to position said components in said coupling relation.

13. An assembly according to claim 10 wherein said means for precluding angular displacement comprises a locking pin insertable in an opening in said second component and a selected one of plurality of registrable openings in said first component circumferentially spaced relative to said axis when said components are disposed in said coupling relation.

14. An assembly to claim 10 wherein said means for precluding angular displacement comprises a plurality of sets of opposed abutment surfaces provided on said first component, spaced circumferentially relative to said given axis when said components are in said coupling relation, means mounted on said second component registrable with a selected set of opposed abutment surfaces and displaceable within a first position between a selected set of abutment surfaces for restricting the angular displacement of said components relative to each other about said axis and a second position without said set of abutment surfaces for permitting angular displacement of said components relative to each other about said axis and means for displacing retaining means for precluding angular displacement between said first and second positions.

15. An assembly according to claim 14 wherein said annular flange portion is provided with a plurality of recesses spaced circumferentially about an outer annular surface thereof defining said sets of opposed abutment surfaces.

16. An assembly according to claim 15 wherein said annular flange portion has a gear-like configuration.

17. An assembly according to claim 15 wherein said displacing means comprises a fluid actuated cylinder assembly.

18. An assembly according to claim 14 wherein said means for precluding angular displacement is displaceable between said first and second positions along a line of travel disposed diametrically relative to said axis.

* * * * *